United States Patent [19]
Singh

[11] 3,987,683
[45] Oct. 26, 1976

[54] POLY-V-BELT AND PULLEY MECHANISM

[75] Inventor: Gurdev Singh, Deerfield, Ill.

[73] Assignee: General Electric Company, Louisville, Ky.

[22] Filed: Sept. 3, 1974

[21] Appl. No.: 502,621

[52] U.S. Cl. .............................. 74/229; 74/230.5; 74/230.05
[51] Int. Cl.² ........................................ F16H 7/18
[58] Field of Search ............ 74/229, 230.01, 230.05, 74/230.5, 240, 241, 231 R, 233, 234

[56] References Cited
UNITED STATES PATENTS

| | | | |
|---|---|---|---|
| 453,093 | 5/1891 | Sullivan | 74/230.5 |
| 1,728,372 | 9/1929 | Shields | 74/229 |
| 2,728,239 | 12/1955 | Adams, Jr. | 74/230.5 |
| 2,747,717 | 5/1956 | Cunningham et al. | 74/229 |
| 3,523,461 | 8/1970 | Nemecek et al. | 74/229 |
| 3,807,247 | 4/1974 | Shiina | 74/230.05 |

Primary Examiner—Samuel Scott
Assistant Examiner—Allan R. Burke
Attorney, Agent, or Firm—Frederick P. Weidner; Francis H. Boos

[57] ABSTRACT

A poly-V-belt and pulley mechanism including a rib-and-groove tractive face belt for service as a transmission belt, conveyor belt or the like, and a pulley over which the belt is trained. The pulley has a spool with grooves and ribs to correspond to and mate with the rib-and-groove tractive surface of the belt and upwardly and outwardly diverging opposing side walls, each being curved convexly. This poly-V-belt and pulley mechanism provides for self-alignment of the ribs of the belt in the grooves of the pulley.

4 Claims, 2 Drawing Figures

POLY-V-BELT AND PULLEY MECHANISM

BACKGROUND OF THE INVENTION

1. Field of the Invention

This invention relates to an improved combination belt and pulley used in a belt drive mechanism.

2. Description of the Prior Art

So called V-belts and multiple groove belts have heretofore been employed in conjunction with pulleys for power transmission purposes. One such V-belt pulley is disclosed in U.S. Pat. No. 3,225,614. In many cases the belts are not of V-section but are of trapezoidal section, and have a number of ribs across the contacting surface of the belt which are seated in and engage grooves in the pulley. Such a multiple rib belt and pulley arrangement is disclosed in U.S. Pat. No. 2,728,239. These belt and pulley mechanisms have been used for driving the rotatable horizontal axis drum of laundry machines such as automatic clothes dryers. The pulley is of small diameter and driven by an electric motor with the belt wrapping around the clothes dryer drum which is substantially larger in diameter than the pulley so that the drum is driven at a speed much slower than the drive pulley. Multiple groove or poly-V-belts, as they are often called, have been utilized for this purpose as they have been found to perform quite well with a minimum of slippage due to the poly-V configuration and mating of the spool of the pulley. Because the pulley is quite small in diameter relative to the drum, good traction between the belt and pulley is needed for power transmission. Moreover, the use of poly-V belts result in a belt of smaller overall dimensions for a predetermined power capacity.

One of the difficulties, however, in the utilization of a poly-V belt and pulley mechanism is that during the assembly of the mechanism there may be misalignment of the belt ribs to the drive pulley grooves. When this occurs the operation of the belt and pulley mechanism is detrimentally affected by the additional stress on some of the ribs which in turn reduces the belt life and induces a change in the speed of the driven item, such as the clothes dryer drum. In addition, such misalignment condition can cause the belt to actually come off the pulley and make the drive mechanism inoperative.

It is desirable to be able to have a poly-V belt and drive pulley mechanism that will automatically compensate for any misalignment of the belt ribs in the proper mating pulley groove and in addition prevent the belt from coming off of the pulley should there be any such misalignment.

SUMMARY OF THE INVENTION

There is provided a mechanism including the combination of a rib-and-groove tractive face belt for service as a transmission belt, conveyor belt or the like, and a rib-and-groove pulley over which the belt is trained. The pulley has a spool with grooves and ribs to correspond and to mate with the rib-and-groove tractive surface of the belt and upwardly and outwardly diverging opposing side walls each being curved convexly.

DESCRIPTION OF THE PREFERRED EMBODIMENT

Figure 1:
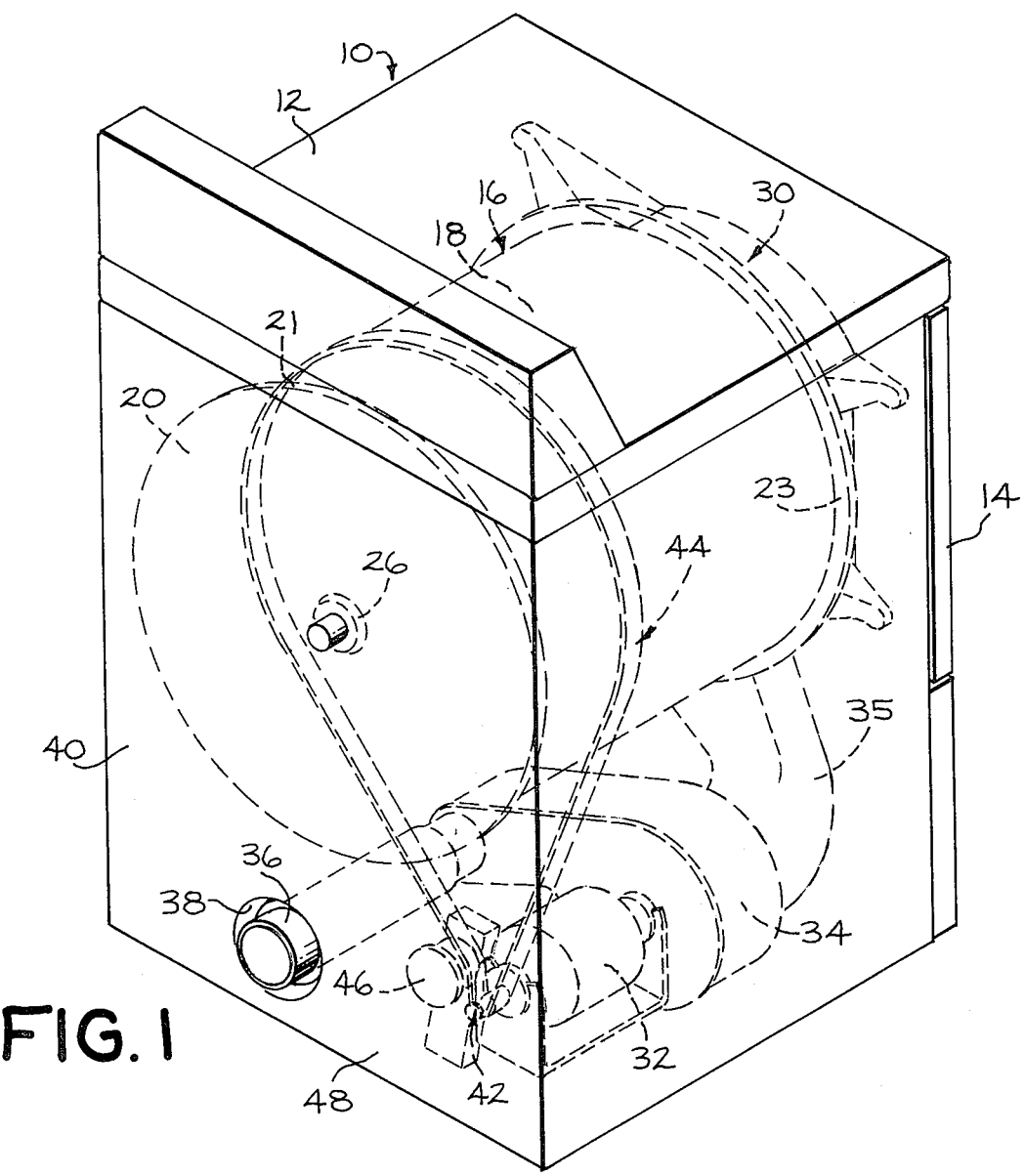
FIG. 1 is a partially cut away perspective of a laundry machine showing the arrangement of the various machine components and including the poly-V belt and pulley mechanism.

Referring now to the drawings, there is illustrated a laundry machine 10 including an appearance and protective outer cabinet 12 having an access door 14 which is hingedly secured to the front wall of the cabinet 12. Within cabinet 12 there is provided a clothes tumbling container or drum 16 mounted for rotation about a horizontal central axis. Drum 16 is cylindrical in shape and has a cylindrical side wall 18, a rear circular wall portion 20 secured to the cylindrical side wall 18 as by a crimped flange generally shown around the periphery of the circular wall portion 20 as 21. The front drum portion is a circular member (not shown) that may be secured to the cylindrical side wall 18 by a crimped flange 23 and has an opening in communication with an access opening through the cabinet 12 which is covered by access door 14.

Such laundry machines are provided with an automatic control so that the operator by manually setting the control and actuating a second means causes the machine to start and automatically proceed through a desired cycle operation. In some cases the laundry machine may simply dry clothes while in others it may be a combination washer-dryer machine which will include washing, extraction and drying operations. Both types of laundry machines may utilize this invention as they have a horizontal axis type drum driven by a poly-V belt and pulley mechanism.

The drum 16 is rotatably supported within the cabinet 12 at the rear thereof by a central stub bearing axle assembly 26 that supports the drum at the center of the rear circular wall 20. The front of the drum 16 is rotatably supported on a large circular component 30 which has an access opening at the front of the drum. The forward end of cylindrical side wall 18 rests on two slide members (not shown) each located on the large circular component 30 to slidably support the front portion of the drum 16. In this manner then the drum may be rotated and is supported in its proper position within cabinet 12 at the front by the slide members and at the rear by central stub bearing assembly 26.

There is provided within the laundry machine an electric motor 32 for driving the driven components of the machine. The motor shaft extending toward the front of the machine, as shown in the drawings, is connected to a wheel in a blower 34 for causing the air to flow through the system within the machine. Air is drawn from the interior of the drum 16 through duct 35 to blower 34. Air leaving the blower 34 may be expelled from the machine through an air conduit 36 that projects through an opening 38 in the rear wall 40 of cabinet 12. Alternatively, the air which is moisture laden may be directed through a condenser unit (not shown) within the machine wherein the moisture is removed from the air and the air then recirculated back through the system.

The motor shaft extending toward the rear of the machine has secured to it a belt pulley 42 for driving an endless belt 44 which wraps around the cylindrical side wall 18 of the drum 16 so that the electric motor through the belt pulley and belt cause the drum 16 to be rotated. To take up any slack in the belt 44 there is a belt tension assembly 46 provided and may be secured to the base 48 of cabinet 12.

Figure 2:
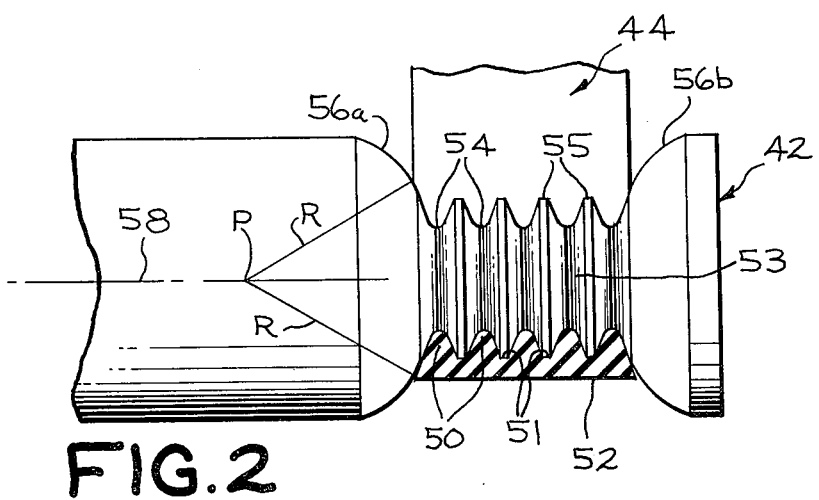
FIG. 2 is an enlarged side plan view of the poly-V belt and pulley mechanism partially in cross section.

With reference to FIG. 2, the details of the combination belt and pulley mechanism is shown in an enlarged view. An endless, flexible poly-V belt 44 is trained over pulley 42. The working face of the poly-V belt carries a plurality of adjacent V-sectioned ribs 50 with grooves 51 therebetween and has a top portion 52 which is flat. The ribs 50 and grooves 51 being parallel to each other and extending over the continuous tractive face of the belt 44. Such belts are made of an elastomeric material, such as neoprene, and may include cords for strengthening. The pulley 42 has a spool 53 with a plurality of annular grooves 54 and ribs 55 therebetween. The grooves 51 are so shaped and so dimensioned as to receive the belt ribs 50. In the embodiment shown in the drawings the belt ribs 50 and grooves 51 in the pulley spool have no clearance space and interfit with each other when the belt is in contact with the pulley spool. In some cases of poly-V belt and pulley mechanisms there is a clearance between the belt ribs and the pulley grooves and this invention works with that type of mechanism also. It should also be noted that the cross sectional shape of the belt may vary and the shape of the ribs in cross section may also be varied within this invention.

To retain the belt 44 on the pulley 42 there is provided opposing pulley side walls 56a and 56b which extend upwardly and outwardly from the spool 53 of pulley 42. The side walls 56a and 56b normally extend a greater distance from the spool of the pulley than the thickness of the belt 44 as can readily be seen in FIG. 2. Heretofore, it was common practice for the opposing side walls of pulleys to diverge upwardly and outwardly and be straight sided. In my invention the opposing side walls diverge upwardly and outwardly but are convexly shaped. That is, each opposing side wall of 56a and 56b of the pulley is curved upwardly and outwardly from the spool 53 of pulley 42. The convexly shaped side walls are formed by machining or any other suitable forming operation to conform to a curvature generated by a radius which is designated "R" in FIG. 2, the center point "P" of the radius being located on the axis 58 of the pulley. While the radius to provide the upwardly and outwardly convexly shaped side walls 56a and 56b may be varied depending upon the application or mechanism in which it is employed, I have found that a radius R of approximately 0.300 inches has performed quite satisfactorily relative to a belt having a width of 5/16 inches.

By providing the upwardly and outwardly convexly shaped side walls 56a and 56b in pulley 42, should there be any misalignment of the belt ribs 50 in pulley spool grooves 54, rotation of the pulley automatically shifts the belt 44 laterally with respect to the pulley spool 53 and causes the ribs 50 of the belt and grooves 54 of the spool to be aligned properly. Because of the small dimensions of the belt and pulley and particularly the ribs 50 of the belt and grooves 54 of the spool it is difficult for them to be aligned properly during assembly of the mechanism. As a result the misalignment will produce in many cases premature destruction of the belt, inefficient operation of the belt and pulley mechanism, and the belt can even come off the pulley. All of these increase repair maintenance necessary to correct the condition. By this invention the poly-V belt is self aligning and therefore minimizes or eliminates these problems.

The foregoing is a description of the preferred embodiment of the invention and variations may be made thereto without departing from the true spirit of the invention, as defined in the appended claims.

What is claimed is:

1. In the combination of a rib-and-groove tractive face belt for service as a transmission belt, conveyor belt or the like, wherein the ribs and grooves are parallel to the length of the belt, and a pulley over which the belt is trained, the pulley having (a) a spool with annular grooves and ribs to correspond to and mate with the rib-and-groove tractive surface of the belt, and (b) upwardly and outwardly diverging opposing side walls, the improvement comprising the said opposing side walls of the pulley each being curved convexly.

2. In the combination rib-and-groove tractive belt and pulley claim 1, wherein the radius of curvature of the opposing side walls is approximately 0.300 inches.

3. In the combination rib-and-groove tractive belt and pulley of claim 1 wherein the opposing side walls extend upwardly and outwardly beyond the belt when the belt is in contact with the pulley spool.

4. In the combination rib-and-groove tractive belt and pulley of claim 1 wherein the belt has a continuous tractive face with the ribs and grooves parallel to each other and the number of ribs are equal to the number of spool grooves.

* * * * *